Patented May 11, 1943

2,318,959

UNITED STATES PATENT OFFICE 2,318,959

ARTIFICIAL GLASS

Irving E. Muskat, Maxwell A. Pollack and Franklin Strain, Akron, and William A. Franta, Barberton, Ohio, assignors to Pittsburgh Plate Glass Company, Allegheny County, Pa., a corporation of Pennsylvania No Drawing. Application April 4, 1940, Serial No. 327,802

21 Claims. (Cl. 260—80)

This invention relates to an artificial glass and to the manufacture of such a material. In the past, numerous attempts have been made to develop a product possessing the characteristics of transparency, hardness and temperature, solvent, and wear-resistance, corresponding to that of glass and exhibiting greater flexibility and resistance to shattering than glass.

Numerous materials have been proposed for this purpose but prior to the present invention, no product has been developed which possesses all of these desirable characteristics. Various resins have been developed in recent years for use as glass substitutes. However, these materials are undesirably soft and are readily scratched. Thus, in many cases where they are used in lieu of glass, they cannot be cleaned conveniently for the reason that the surfaces thereof become seriously abraded during wiping or scrubbing operations. In addition, the surfaces of many of these plastics are attacked by water or organic solvents. The impairment of the surface often occurs during the use of these materials and has seriously limited the extent of their use as artificial glass.

In accordance with our invention, we have been able to provide a composite resinous product of high transparency and stability to light which is resistant to the action of abrasives and organic solvents and which also possesses the properties of great flexibility and resistance to shattering. This product possesses a surface which is unusually scratch resistant and is comparable to glass in many respects. More particularly, we have been able to provide an integral resinous sheet having an exterior of unusually high hardness and abrasion resistance and an interior which is relatively more soft and more flexible. These products are so prepared that the hardened surface is merged with the softer interior generally by a graduation in degree of polymerization, concentration of plasticizers, etc., whereby the surface actually is an integral portion of the base polymer and is at least partially interpolymerized therewith as distinguished from a layer or a coating which is applied to a base and which may in some cases tend to flake off to an objectionable degree.

The invention is applicable to transparent resinous products such as may be prepared from organic compounds capable of polymerizing or condensing to form transparent, infusible polymers and is particularly applicable to resins obtained from compounds containing two or more polymerizable groups which are unconjugated with respect to carbon atoms particularly organic oxygen compounds of this type. Thus, desirable polymers may be obtained from unsaturated alcohol esters of unsaturated monobasic acids such as vinyl, allyl, methallyl, crotyl, methyl vinyl carbinyl, chlorocrotyl, 2-chloroallyl, oleyl, propargyl, etc. esters of acrylic or alpha-substituted acrylic acids such as methacrylic or alpha chloracrylic acids or other unsaturated acids such as cinnamic, propiolic, crotonic, furoic, tiglic, or other acid. Similarly, polymers may be prepared from the polyhydric alcohol polyesters of these unsaturated acids or other monobasic unsaturated acids such as glycol dimethacrylate, dichloracrylate, diacrylate, dicrotonate, dicinnamate, difuroate, ditiglate, dipropiolate, etc., glycerol di- or tricrotonate, acrylate, methacrylate, etc., or the sorbitol, or mannitol polyesters of the above-named acids or mixed esters, such as glycol monoacrylate, monocrotonate, glycerol dimethacrylate, monoacrylate, etc. The corresponding amides of the above acids, such as diallyl crotonamide, diallyl acrylamide, methacrylamide, etc., mono allyl or mono crotyl or other unsaturated acrylamide, crotonamide, methacrylamide, etc., or substituted ureas such as diallyl urea, dicrotyl urea, etc. also may be used.

Other products may be secured by polymerization of other organic compounds which contain at least two polymerizable groups, preferably those in which one of the groups is the polymerizable group $$CH_2=\overset{|}{C}-$$

and is separated from the other group by at least one atom whereby the groups are unconjugated with respect to carbon atoms. Thus, the unsaturated alcohol esters or amides or thio esters of polybasic acids such as diallyl phthalate, diallyl malonate, diallyl tartrate, diallyl oxalate, di- or triallyl citrate, mono- or diallyl maleate, mono- or diallyl fumarate, or the corresponding methallyl, propargyl, crotyl, 2-chlorallyl, oleyl, or other unsaturated polyester or mixed esters such as allyl crotyl phthalate, malonate, maleate, tartrate, citrate, oxalate, etc., or the corresponding allyl methallyl, or crotyl methallyl or allyl propargyl esters, or alkyl alkenyl esters such as allyl ethyl, allyl methyl, crotyl methyl, allyl isopropyl, or allyl butyl maleate, fumarate, etc. may be used in accordance with this invention. In addition, the invention also is applicable to the corresponding esters of silicic, carbonic, titanic, phosphorous, phosphoric, sulphuric, sulphurous or boric or other inorganic polybasic acid esters such as diallyl sulphate, di- or triallyl phosphate, di- or triallyl borate, di- or triallyl phosphite, allyl silicates, allyl titanates, propargyl, crotyl, methallyl, or similar esters, or salts of unsaturated acids and polyvalent metals such as calcium, barium, magnesium, strontium, aluminum, iron, titanium, tin, arsenic, antimony, polymethacrylate, polyacrylate, polychloroacrylate, polycrotonate, or the corresponding anhydrides of acrylic, chloroacrylic, methacrylic, crotonic, or other acids may be polymerized to form hard products in accordance with this invention.

In accordance with a further modification, products may be derived by treatment of compounds containing two or more polymerizable groups which are conjugated as to carbon although the products may be somewhat different in character. Thus, butadiene, chlorobutadiene, vinyl acetylene, etc. may be polymerized in accordance with the invention as hereinafter more fully described to produce polymers having a relatively soft interior and a relatively hard exterior. While such polymers in many cases may be opaque, they have many desirable properties.

In order to obtain products of maximum hardness, it is desirable to utilize compounds wherein the number of carbon atoms in the monomeric molecule is not excessive. Thus, allyl methacrylate polymerizes to form substantially harder products than the polymer produced by direct polymerization of oleyl methacrylate. Other things being equal, the trend toward softer products increases as the number of carbon atoms increases. This trend toward softer product with increase in carbon atoms may be minimized by increasing the number of polymerizable groups in the composition. Thus, sorbitol hexamethacrylate polymer is substantially harder than oleyl methacrylate polymer. In general, it is preferred to make use of agents wherein the ratio of the number of carbon atoms to the number of polymerizable olefinic groups does not exceed 15, and preferably materials wherein this ratio does not exceed 8, are made use of. In addition, it is found that most desirable products are secured through use of materials containing not in excess of 10 carbon atoms, in each of the alcohol residues and the acid residues.

The resin sheets may be prepared in accordance with our invention by polymerization of the monomeric material, if desired. In many cases, however, this is found to be difficult. With rapidly polymerizing materials, such as allyl, vinyl, crotyl, propargyl, or methallyl methacrylate, acrylate, or alpha-chloracrylate, polymerization often is difficult since bubbles often form in the product and the shrinkage due to polymerization is so great that fractured products often are produced. On the other hand, with more slowly polymerizing materials, such as allyl, methallyl, or crotyl crotonate, or cinnamate, dicrotyl or diallyl esters, such as dicrotyl phthalate, or diallyl phthalate, the products often are not sufficiently hard due to the presence of unpolymerized monomer which may serve as a plasticizer. Accordingly, it is often desirable to prepare the resinous products from a fusible heat-convertible polymer of the polymerizable products hereinbefore mentioned.

It has been discovered that polymerizable compounds, such as those which are contemplated herein and which ordinarily polymerize to form infusible insoluble products, may, under proper conditions, be polymerized to form a soluble, fusible polymer which may be polymerized further to the infusible state.

A fusible polymer of this type may be prepared, for example, by conducting the polymerization in a solution which is capable of dissolving the polymer and interrupting polymerization at the proper time. Thus, when a polymerizable compound containing two or more polymerizable groups, such as allyl chloracrylate, allyl methacrylate, etc., is dissolved in a solvent such as acetone, dioxane, chloroform, etc., a soluble polymer is initially formed, but as polymerization proceeds, the insoluble polymer is produced and the solution is converted into a non-reversible gel. By interrupting polymerization before the gel is formed, a soluble, fusible polymer may be secured. This polymer is found to be soluble in a majority of solvents in which the polymer of the saturated acrylate or vinyl esters are normally soluble. Acetone, chloroform, toluene, dioxane, triacetin, phenyl cellosolve, ethyl cellosolve acetate, benzene, etc. are suitable solvents, in general. The fusible polymers may be recovered by evaporation or distillation of the solvent or by addition of a nonsolvent, such as methyl or ethyl alcohol, or water.

In general, it has been found that the solvents in which similar polymers of the corresponding monofunctional compounds which contain only one polymerizable group, such as methyl methacrylate, methyl chloracrylate, vinyl acetate, etc. are soluble, should be used for this purpose. Thus, such solvents as acetone, dioxane, chloroform, toluene, benzene, carbon tetrachloride methyl cellosolve acetate, phenyl cellosolve, dichloroethyl ether, xylene, tetralin, dibutyl phthalate, etc., are found to be suitable. In addition, the saturated acrylic or alpha-substituted acrylic esters such as monomeric methyl, ethyl, propyl, etc. methacrylate or chloracrylate, or other polymerizable materials, for example "vinylic" compounds, such as styrene, vinyl chloride, vinyl acetate, etc., may be added to the above solution before polymerization in order to form copolymers. Since such materials, particularly vinyl acetate, styrene, etc., dissolve substantial amounts of the fusible polymers, they may be used themselves as solvents.

In each case, the polymerization should be interrupted before the infusible product is produced. This may be accomplished by stopping polymerization before gel formation is observed. In accordance with one illustrative method of interrupting polymerization, the polymer may be separated from the solvent by convenient methods, for example, by the addition of a compound in which acrylate polymers are normally insoluble, such as methyl or ethyl alcohol, petroleum ether, water, ethylene glycol, etc. This process permits the isolation of the fusible polymer of the unsaturated acrylic and alpha-substituted acrylic esters or of other polyfunctional compound herein described in a substantially pure state.

Polymerization may also be halted by lowering the temperature of the reaction mixture to a suitable degree, for example, to room temperature or below. It has been found that, although polymerization proceeds fairly rapidly at temperatures of 35–40° C. or above, the reaction rate increasing with increase of temperature, it may become negligible at lower temperatures. This is especially true when polymerization is carried out in solution.

In accordance with one effective method of interrupting polymerization, inhibitors such as pyrogallol, hydroquinone, aniline, phenylene diamine, sulphur, thiophenol, organic or inorganic salts or complexes of the reduced forms of metals, such as copper, manganese, cobalt, etc., dipentene, etc., may be added to the polymer during polymerization or before polymerization has been initiated. These solutions may be treated to remove the solvent by slow evaporation, treatment with a nonsolvent, or by other suitable method and fusible thermoplastic polymers which may be molded, machined, cut, bent, or otherwise worked into desirable forms thereby obtained. These molded products may be completely hardened and rendered infusible during shaping or after final shaping by suitable methods hereinafter more fully set forth.

In the polymerization of allyl and methallyl esters of acrylic and alpha substituted acrylic acids, such as allyl methacrylate, it has been found that the yields of fusible polymer appears to be dependent to a great extent upon the concentration of the monomer in the solution undergoing polymerization. Thus, when very concentrated solutions containing a large quantity, for example, in excess of 40–50 percent, of the monomeric allyl or methallyl methacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent, by weight, yields of the fusible polymer upward of 75 percent of the theoretical may be secured. Accordingly, it is preferred to deal with solutions having a monomer concentration below 40 percent by weight.

The yield of fusible polymer appears to be increased by treating the solutions at increased temperatures and increased catalyst concentrations. Thus, substantially greater yields may be secured by polymerizing allyl methacrylate solutions at 100° C., or above, than may be secured at 60° C. Catalyst concentrations up to 5 percent or more may be used in some cases. In general, conditions favoring the formation of lower molecular weight polymers appear to result in increased yields of fusible products. Further details relating to the preparation of a fusible glycol acrylate, allyl methacrylate, or similar polymer may be found in copending application of Franklin Strain, Serial No. 257,133, filed Feb. 18, 1939, and an application of Maxwell A. Pollack, Serial No. 226,310, filed August 23, 1938.

In order to improve the yield of fusible polymer obtained from the materials herein discussed, the polymerization may be conducted in the presence of a quantity of an inhibitor such as hydroquinone, sulphur, resorcinol, aniline, pyrogallol, etc., in an amount sufficient to decrease the rate of polymerization. By polymerizing in the presence of an inhibitor and the presence or absence of a catalyst, as required, yields of fusible polymer are materially improved.

In many cases, the fusible polymer may be obtained by conducting the polymerization in the substantial absence of solvents. This is particularly true in the production of fusible polymers from those materials which polymerize slowly, for example, the unsaturated crotonic acid esters, such as allyl or methallyl crotonate, or the corresponding phthalates, maleates, oxalates, itaconates, etc. In some cases, it is found desirable to polymerize the polymer in the absence of solvents and subsequently, to recover the fusible polymer before the material has been polymerized to an infusible gel by dissolving the product in a suitable solvent such as acetone and precipitating the fusible material with a nonsolvent such as water or methyl alcohol. If desired, the polymer may be fractionally precipitated by water or similar nonsolvent. Thus, allyl methacrylate may be polymerized in solution to form a fusible polymer. Thereafter, sufficient water may be added to cause separation of the polymer without precipitation of monomer. After removal of polymer, the monomer may be precipitated again with a further amount of water. In many cases, however, the residual monomer may be removed by distillation at low temperatures in a vacuum. This process is particularly effective in dealing with materials which polymerize to form viscous products which retain a substantial quantity of unpolymerized monomer. These products may be converted into resin sheets in accordance with this invention. In such a case, however, it is generally desirable that the intermediate fusible polymer be present in an amount in excess of that which can be obtained under normal circumstances by partially polymerized, undissolved or undiluted monomer.

In the case of those materials which are active and polymerize rapidly, such as allyl methacrylate, the yield of fusible polymer which is obtained by direct polymerization of undiluted monomer is so low as to be ineffective for most purposes. While a somewhat higher yield of fusible polymer may be obtained from less actively polymerizing substances by direct polymerization of the monomer, it is found that the polymer produced contains too much monomer and that soft products are produced in the final polymerization, unless some monomer is removed. Generally speaking, the fusible polymer should comprise a major portion of the polymerizable constituents in the coating composition. For the more active materials, such as allyl, methallyl, ethyl allyl or chlorallyl acrylate, methocrylate, or chloracrylate, or the corresponding polyhydric alcohol polyesters, the fusible polymer content should be above 10 percent by weight of the polymerizable constituents. For less active products, such as diallyl phthalate, or diallyl maleate, the fusible polymer content is preferably maintained above 35 percent and in general, is 50 percent or more of the polymerizable constituents in the composition.

In some cases the fusible polymers secured by polymerization of the monomer as herein described results in the production of a base which is not sufficiently tough for many purposes. Accordingly, it often is desirable to prepare a polymerizable material from thermoplastic polymers. This may be done by introducing unsaturated groups in such polymers. These unsaturated polymers may be polymerized to form hard, substantially infusible and insoluble polymers, many of which are transparent, colorless and possess glass-like properties.

This phase of the invention has been found to be particularly applicable to the treatment of polymers of the lower unsaturated alcohols such as polyallyl alcohol, polyvinyl alcohol, polycrotyl alcohol, polymethallyl alcohol, poly-2-chloroallyl alcohol, 2-fluorallyl alcohol, polyoleyl alcohol, or the derivatives thereof, such as the corresponding halides such as polyvinyl chloride, polyallyl chloride, polymethallyl chloride, polymerized vinylidene chloride, polycrotyl chloride, polyvinyl esters such as polyvinyl acetate or butyrate, etc., esters of polyallyl alcohol such as polyallyl acetate, propionate, butyrate, etc., nitrate, monoallyl oxalate, etc., polycrotyl esters or salts such as polycrotyl chloride, nitrate, cyanide, acetate, etc., or esters or salts of other similar polyalcohols, such as polymerized 2-chloroallyl alcohol, methallyl alcohol, propargyl alcohol, 3-butenyl alcohol, ethyl allyl alcohol, oleyl alcohol, etc. Similarly, the process may be extended to the treatment of polymerized unsaturated acids, amides, thioamides, or esters of such acids, such as polyacrylic acid, polyacrylic chloride or bromide, polyacrylyl nitrile, polymethacrylic acid, polymethacrylyl chloride, polymethacrylyl nitrile, amide, etc., crotonyl chloride, polychloracrylic acid and poly α-chloracrylate, polyfluoracrylates, such as methyl α-fluoracrylate, fluoracrylic acid, etc.

These materials may be treated in convenient manner to introduce unsaturated polymerizable radicles therein. Thus, the polymerized unsaturated alcohols such as polyvinyl or polyallyl alcohol may be esterified with polymerizable unsaturated acids such as crotonic, maleic, acrylic, methacrylic, or alpha chloracrylic acids to form the corresponding acrylate, methacrylates, chloracrylates, or crotonates. Or the polymerized alcohols may be etherified with vinyl, crotyl, allyl, methallyl, or 2-chlorallyl or other unsaturated alcohol radicles to form the corresponding unsaturated ethers. In similar manner, polymers of unsaturated acids, esters, acid chlorides and halides, amides or similar derivatives may be treated to introduce unsaturated alcohol groups and thus to form the corresponding polyacrylates, polychloracrylates, polymethocrylates, etc.; polycinnamate, polymaleic acid or mono esters thereof, etc., such as allyl, methallyl, 2-chloroallyl, or crotyl polymethacrylate, polychloroacrylate, polycrotonate, etc.

Ethers may be suitably formed by treatment of various polymers such as polyvinyl chloride, or acetate, with an alcoholate of an alkali metal such as sodium allylate, sodium ethylate, sodium methallylate, sodium methylate, etc. In a corresponding manner, polymeric hydroxy compounds, such as polyvinyl alcohol, polyallyl alcohol or poly-2-chloroallyl alcohol may be treated with caustic to form sodium compounds thereof which may be reacted with unsaturated or saturated halides or sulphates such as vinyl chloride, allyl chloride, methallyl chloride, etc., or they may be treated with unsaturated aldehydes such as acrolein or crotonaldehyde to form the corresponding acetals such as the acetal of polyallyl alcohol, poly 2-chloroallyl alcohol, methallyl alcohol or crotyl alcohol. Similarly, polymeric chloracrylate may be treated to form the corresponding ethers, either by partial or complete hydrolysis of the chlorine atoms followed by treatment with caustic to form sodium or potassium derivatives thereof, and then with unsaturated halides or sulphates or by direct treatment of the chloroacrylate polymer with the desired alcoholate. In this manner, it is possible to secure alpha alkyleneoxy polyacrylates such as allyloxyl polyacrylates, vinyloxy polyacrylates, etc.

In addition, hydrocarbon polymers such as polystyrene, polyisobutylene, etc., may be treated to introduce vinyl, allyl, or other unsaturated groups therein. For example, polystyrene may be treated with allyl or vinyl chlorides in the presence of aluminum chloride to give a fusible polymer containing polymerizable groups. By subsequent heating, the polymers may be converted to products which vary in properties from partially fusible, rubbery types, to hard, unreactive products. Thus, rubberlike products may be obtained in a sample from comparatively low-molecular weight isobutylene or polystyrene polymers by treating with an unsaturated compound such as allyl alcohol or chloride or the corresponding olefine, in the presence of a condensating agent such as sulfuric acid or aluminum chloride, whereas prior to the present invention, such products could be secured only from high molecular weight polymers of styrene or isobutylene.

Copolymers also may be treated in accordance with the present invention. Thus, a vinyl halide or organic ester, such as vinyl acetate, vinyl chloride, etc. may be polymerized with an acrylic compound such as chloroacrylic acid, methacrylic acid or esters, amides or nitriles thereof, and the copolymers may be treated to introduce unsaturated groups. Similarly, polyallyl or polycrotyl derivatives may be obtained by copolymerizing allyl or crotyl alcohol or esters thereof such as the oxalic, phosphoric, tartaric, or boric esters, etc., with other polymerizable materials, such as the acrylate, vinyl compounds, e. g., vinyl chloride, vinyl acetate, vinyl butyrate, vinylidene chloride, etc. The copolymers may then be treated to hydrolyze the ester groups (oxalate, etc.) from the allyl group, thereby forming a polyallyl alcohol copolymer which may be treated to form unsaturated derivatives as herein described.

Improved products may also be prepared from fusible polymers of the phenol-formaldehyde type. One of the undesirable features of the further polymerization of these polymers has been the fact that water and other condensation products are liberated. However, by treating the fusible polymers with allyl chloride and an alkali or other aid to the reaction, unsaturated allyl groups are very easily introduced into the molecular structure, and the resulting product readily undergoes polymerization of the "vinyl" type to a hard, transparent mass without the evolution of water or other undesirable by-products. Cresols, tar acids, and other phenolic bodies which do not ordinarily proceed beyond the fusible polymer state when polymerized with aldehydes lend themselves readily to the introduction of unsaturated groups, and the subsequent polymers may easily be rendered infusible and insoluble by heat or light, particularly in the presence of peroxide catalysts.

Similar results may be obtained in the urea-formaldehyde series of polymers. Allyl or other unsaturated groups may be introduced to form fusible polymers. Numerous other unsaturated radicles such as unsaturated aldehydes, for example, crotonaldehyde, acrolein, or cinnamaldehyde may be used for this purpose.

In carbohydrates, such as cellulose and starch, unsaturated groups are readily introduced to form heat-convertible polymers. Cellulose or its derivatives, may be allowed to react with unsaturated aldehydes, halides, alcohols, or acids in the presence of condensing agents to form the corresponding acetals, ethers or esters which may then be heated for conversion to the infusible form.

In many cases compounds containing two or more types of unsaturated groups of the same or different activity may be secured. Thus, vinyl and allyl groups or allyl and crotyl groups may be introduced into the same polymer. Similarly, the product produced may contain both saturated and unsaturated groups. For example, polymeric halides such as polyvinyl or polyallyl chlorides may be treated with sodium allylate and sodium methylate or ethylate or from mixed allyl-methyl or allyl ethyl ethers or polymeric alcohols may be esterified with mixtures of saturated and unsaturated acids such as mixtures of acetic and/or butyric acid with acrylic, methacrylic, or crotonic acid. In similar manner, polymeric esters such as polyvinyl acetate, polyallyl acetate, polyallyl oxalate, etc. may be partially hydrolyzed and the free hydroxyl groups esterified or etherified or condensed with aldehydes in the manner described herein for introduction of unsaturated radicles.

Other polymers having desirable characteristics may be obtained by polymerizing unsaturated compounds which contain in addition to a polymerizable radicle a second radicle having the group HX, where X is halogen such as chlorine, fluorine, or bromine, or a hydroxyl radicle or an alkoxy or alkylene-oxy radicle or other negative groups which may be removed as HX to form a corresponding unsaturated compound. For example, allyl esters of di- or monochloro propionic acid may be polymerized and the polymer may be treated with alkali or by other means to remove HCl and to form the corresponding acrylic or chloracrylic ester which may be further polymerized to form an infusible polymer. In addition, esters of unsaturated polymerizable acids such as acrylic, methacrylic or other alpha-substituted monoesters of dichloropropanol, monochloropropanol, glycerin, monochlorohydrin or of other halohydrin may be formed and polymerized. These polymers thereafter may be treated by heat, alkali, boron trifluoride, POCl₃, etc. to remove HX to form an unsaturated product which may be polymerized. In similar manner, unsaturated compounds which enolize such as allyl pyruvate or allyl ester of aceto acetic acid or the homologues thereof may be polymerized and subsequently treated to convert the product to its unsaturated enol form which may be further polymerized. Acrylic esters may be prepared by reacting acrylic salts such as sodium methacrylate with olefin chlorohydrin such as isobutylene chlorohydrin and the resulting hydroxy ester may be dehydrated by convenient dehydrating agent such as BF₃, P₂O₅, POCl₃, etc. to form a methallyl ester which may be polymerized.

In accordance with a further modification, polymers containing halogen atoms may be treated to introduce unsaturated groups. Thus, halo derivatives of polymeric acids or alcohols or esters such as polyvinyl or polyallyl chloracetate or chlorpropionate, chloromethyl or chloroethyl polyacrylate or methacrylate or the corresponding iodides or bromides may be treated with a salt such as potassium, sodium or silver acrylate, methacrylate, etc. to produce polymerizable products for use in accordance with the present invention.

The products thus obtained may be polymerized in the presence or absence of heat, light and/or catalysts to form hard, infusible products which are generally colorless and transparent and are not appreciably affected by the action of solvents. By regulation of the degree of polymerization of the agent undergoing treatment, it is possible to produce products having a wide range of characteristics. Thus, by treating allylic, vinylic or acrylic polymers of high molecular weight, flexible and durable articles may be obtained while by treating polymers which are somewhat lower in molecular weight, harder products which may be somewhat less flexible may be secured. It is also possible to control the properties of the final polymer very accurately by regulating the amount of unsaturated groups which are introduced per unit of polymer. This may be done, for example, by treating a saturated alcohol ester of polyacrylic or alpha-substituted polyacrylic acid such as methyl polymethacrylate, ethyl polymethacrylate, etc. with allyl or other unsaturated alcohol using an amount of alcohol which is insufficient to permit complete ester interchange, or by stopping the interchange at any desired degree of reaction. Similarly, polyacrylic acid, polyacrylic chloride or nitrile or salt of such acids may be treated with a mixture of an unsaturated and a saturated alcohol such as a mixture of methyl and allyl alcohol. If hard, brittle products are desired, the number of allyl, vinyl or other groups will be preferably high, while if softer, more flexible products are desired, the amount of unsaturated groups is decreased. In any case, it is generally preferred to introduce at least 30 percent of the theoretical amount of allyl or unsaturated ester groups which may be introduced. When unsaturated groups are introduced into polymers of unsaturated acids or their derivatives, the esterification may be conducted by heating the saturated polyacrylate, alpha-substituted polyacrylate, polycrotonate, etc. in the presence of the desired alcohol, with or without catalysts, such as sulphuric acid, p-toluene-sulphonic acid or alkali metal compounds such as sodium methoxide, etc. Inhibitors such as hydroquinone, sulfur, copper compounds, phenylene diamine, etc. may be introduced to prevent polymerization of the material during treatment, if necessary. If desired, suitable diluents or solvents may be incorporated to promote reaction. The unsaturated esters after preparation may be recovered by distillation of the solvent or diluent and excess alcohol, if desired, or they may be obtained by precipitation methods through use of a nonsolvent such as water, methyl or ethyl alcohol, etc.

The introduction of the unsaturated groups may often be effected most conveniently by conducting the reaction in a solvent for the polymer undergoing treatment. However, the polymer may be dispersed or emulsified in a suitable reaction medium or, if only a superficial reaction is desired, the reaction may be conducted by exposing the surface of a sheet of the polymer to the action of reagents for the introduction of the unsaturated groups.

The unsaturated polymers so produced have many characteristics which are common to the polymer from which they are derived. Generally speaking, they are soluble in organic solvents and are thermoplastic.

In order to secure a product having proper flexibility and scratch resistance, it is found desirable to produce a polymer which, after curing is complete, remains flexible and relatively more soft in the interior but which is cured to a hard, scratch-resistant state on the outer surface thereof. By this means it is possible to secure an integral product which possesses a surface substantially harder than the interior thereof without recourse to the application of coatings or surface layers which may tend to fracture or flake off through use or in bending operations.

Polymer sheets of this type may be prepared by various means. In accordance with one method a sheet of the fusible polymer may be prepared by molding a quantity of the polymer with or without a suitable plasticizer such as dibutyl phthalate, tricresyl phosphate, amyl naphthalene, etc. This sheet may be cured to its insoluble infusible state in a manner such that the outer portion thereof is cured more completely or to a higher degree of hardness than the interior. This may be done, for example, by subjecting the sheet to surface heating of high intensity while avoiding application of heat of such high intensity upon the interior thereof. For example, one side of the sheet may be cured by application of a smooth hot plate of glass, metal, or other material thereto and heating the surface to a temperature sufficiently high to cure the exterior to the proper degree of hardness, for example, 125 to 150° C. or above. Excessive curing of the interior thereof may be prevented by maintaining the opposite side of the sheet substantially cooler, for example, 20 to 30° C. Thereafter, the hardened surface may be cured to high hardness while maintaining the first cured surface cool. Pressures of 100 pounds per square inch, or above, may be applied, if desired. It is found that, with many of these materials, the hardness and scratch resistance of the material is dependent upon the temperature of curing the resin, and that resins cured at 50 to 80° C. are substantially softer and more flexible than those cured at 120 to 150° C. or above. Thus, by localized heating of the surface, production of the desired product is made possible. After the surface has been hardened as herein described, further heating at a low temperature, for example, 50 to 80° C. may be desirable in order to develop greater toughness in the interior of the resin.

While the method is particularly applicable to the preparation of sheets by polymerization of the fusible polymer, it is not limited to this material since similar sheets may be prepared by polymerization of monomeric material. Thus, the polymer may be prepared by direct cast polymerization of the monomer and subsequently curing the exterior thereof as previously described.

The invention is particularly applicable to production of resins from monomers which polymerize slowly, such as allyl crotonate, methallyl crotonate, crotyl crotonate, or other unsaturated alcohol ester of crotonic or cinnamic or similar acid or mono-, di- or polyallyl or polymethallyl esters of polybasic acids such as oxalic, maleic, fumaric, citric, tartaric, or similar esters of glycol dicrotonate, or equivalent polyhydric ester. On the other hand, difficulty may be encountered in polymerizing highly active materials such as acrylates or alpha substituted acrylates since these materials often polymerize too rapidly to permit establishment of hard and soft zones within the sheet.

In accordance with a further modification, the product may be produced by varying the amount of plasticizer from the interior to the exterior of the resin sheet. This may be done, for example, by depositing the monomer or fusible polymer in a series of layers containing gradually decreasing concentrations of plasticizer and curing the product. Alternatively, a sheet containing a suitable quantity of plasticizer may be prepared and before the polymer is converted to its infusible insoluble form, it may be immersed in a solvent for the plasticizer which is a nonsolvent for the polymer such as ethyl or methyl alcohol. Thereafter, the sheet may be cured in the usual manner.

As a further variation, similar products may be obtained by varying the amount of inhibitor and/or catalyst from the interior to the exterior of the sheet whereby polymerization on the outer surface proceeds to form a hard, scratch-resistant surface while polymerization in the interior does not occur or is incomplete. Similarly, products may be obtained by polymerizing various materials capable of forming fusible polymers such as methyl methacrylate, methyl acrylate, ethyl methacrylate, propyl methacrylate, vinyl acetate, vinyl chloracetate, etc. with polymerizable salts, halides, acid halides, alcohol, or acids such as acrylic, chloride, allyl chloride, allyl alcohol, acrylic acid or the corresponding alpha-substituted acrylic compounds, etc. These compounds may then be treated with various unsaturated compounds to introduce unsaturated groups upon the surface of the compound and the product polymerized. Thus, the copolymer of methyl methacrylate and sodium crotonate may be treated with allyl chloride to form an allyl ester on the surface of the polymer which may be polymerized to harden the surface of the resin. Or these materials may be polymerized alone to form sheets which may be treated with unsaturated alcohols or acids such as allyl alcohol or acrylic acid depending upon the composition undergoing treatment in order to secure an ester interchange and thereby produce a product containing unsaturated groups in the surface which may be polymerized.

The polymers thus prepared show a marked variation in hardness from exterior to interior of the sheet. The surface of these materials is comparable in hardness to that of the corresponding polymer polymerized and cured at high temperature without attempt to establish a soft interior. The interior of the sheet, however, is much softer and more flexible. If desired, it is possible to control the conditions of final curing whereby a portion of the interior is tacky and rubbery. On the other hand, it is possible to obtain a substantially harder interior portion having a flexibility comparable to that of cast polymerized methyl methacrylate, if desired. These conditions may be controlled to a great degree by controlling the time and temperature of curing, plasticizer and catalyst concentration, etc. in order to change the degree of polymerization throughout the resin base. It should be noted that while the invention is primarily directed to the production of products wherein both sides of the sheet have been hardened, it is also possible to provide a product having only one hardened surface, the other being relatively soft and flexible.

Due to the graduated change in polymer characteristics from exterior to interior of the product, little or no flaking of the hard surface from the softer interior is observed. In addition, the product is found to have a greater resistance to ordinary wear and abrasion than coated sheets.

The following examples are illustrative:

*Example I.*—A quantity of soluble fusible polymer of peroxide-free allyl crotonate was molded between two layers of fusible allyl crotonate polymer containing 3 percent benzoyl peroxide at 145° C. under a pressure of 2000 pounds per square inch for 30 minutes and a sheet having a soft slightly gummy interior and a hard scratch resistant exterior was secured.

*Example II.*—A quantity of peroxide-free allyl methyl polyacrylate was prepared by treatment of polymerized methyl acrylate with allyl alcohol. This polymer was formed into a layer and pressed between two layers of the same polymer containing 2 percent of benzoyl peroxide. The product was then cured at 125° C. for 30 minutes under a pressure of 2000 pounds per square inch. A product having a soft interior and a hardened exterior was secured.

*Example III.*—A quantity of fusible allyl crotonate polymer containing 3 percent benzoyl peroxide was placed in a mold between a pair of platens, one of which was heated to 165° C. while the other was kept at 30° C. under a pressure of 5000 pounds per square inch for 10 minutes. A product having one soft surface and one hardened surface was secured.

*Example IV.*—The process of Example III was repeated using a fusible polymer of diallyl phthalate and 5 percent benzoyl peroxide. The temperature of the hot platen was 185° C.

*Example V.*—The process of Example III was repeated using fusible diallyl oxalate polymer and 2 percent benzoyl peroxide.

*Example VI.*—The process of Example III was repeated using polyvinyl crotonate prepared by esterification of polyvinyl alcohol with crotonic acid and 5 percent catalyst.

*Example VII.*—The product prepared as in Example III was placed in a mold and a platen heated to 165° C. was applied to the soft side thereof, the opposing side being maintained cold. After heating for 10 minutes, the product was removed and was found to be soft and flexible in the interior but hard on both sides.

*Example VIII.*—A quantity of fusible allyl cinnamate polymer was treated as in Example III, and a transparent product having a hard exterior and a soft interior was obtained.

*Example IX.*—A sheet containing 100 parts of fusible allyl methacrylate polymer and 20 parts of dibutyl phthalate was formed and coated with a layer of equal thickness of unplasticized fusible allyl methacrylate polymer containing 0.08 percent benzoyl peroxide. The product was then placed between glass plates cured at a temperature of 100° C. for 15 minutes under a pressure of 5000 lbs. per sq. in. Thereafter, the product was cured at 125° C. for 30 minutes, a transparent product having a hard exterior and a softer more flexible interior being obtained.

*Example X.*—A composite uncured sheet of fusible allyl methacrylate polymer formed as in Example IX, was heated between glass plates at 110° C. under a pressure of 5000 pounds per sq. in. for 10 minutes. Thereafter, the product was removed from the mold and heated at 150° C. for three hours in an oven.

Although the present invention has been described and claimed with reference to the specific details of certain embodiments thereof, it is not intended that such details shall be regarded as limitations upon the scope of the invention, except insofar as included in the accompanying claims.

This application is a continuation-in-part of our copending applications Serial Nos. 257,135, filed Feb. 18, 1939, and 302,562, filed Nov. 2, 1939.

We claim:

1. A method of preparing an artificial glass which comprises preparing a fusible heat convertible polymer of a compound which in its monomeric form contains at least two polymerizable double bonds, molding the fusible polymer and further polymerizing the surface of the molded product to a hard, substantially infusible state while simultaneously polymerizing the interior to a substantially lesser extent.

2. A method of preparing an artificial glass which comprises polymerizing a fusible heat convertible compound which in its monomeric form contains at least two polymerizable double bonds, interrupting polymerization before the polymer is converted to an infusible gel, separating the fusible polymer from at least a portion of unpolymerized monomer, molding the fusible polymer and further polymerizing the surface of the molded polymer to a hard, substantially infusible state while simultaneously polymerizing the interior to a lesser extent.

3. The process of claim 2, wherein the compound treated is methallyl crotonate.

4. A transparent integral sheet resin, having an exterior surface portion comprising a hard, scratch resistant and substantially insoluble and infusible polymer of an ester of an unsaturated alcohol and an unsaturated acid, and having an interior portion comprising a relatively softer polymer of the same ester.

5. An artificial glass composition comprising an exterior surface portion of a hard, scratch resistant and substantially infusible and insoluble polymer of an ester of an unsaturated acid and an alcohol having an unsaturated group on a terminal carbon atom, and an interior portion of a relatively softer polymer of the same ester.

6. The product defined in claim 4 in which the ester is an ester of allyl alcohol.

7. The product defined in claim 4 in which the ester is an ester of methallyl acohol.

8. The product defined in claim 4 in which the ester is an ester of crotyl alcohol.

9. The product defined in claim 4 in which the ester is allyl crotonate.

10. A transparent integral sheet of resin having an exterior surface portion comprising a hard, scratch-resistant and substantially insoluble and infusible polymer of an organic oxygen compound containing at least two polymerizable groups which are unconjugated with respect to carbon, and having an interior portion relatively softer than and containing relatively more plasticizer than said surface portion, said interior portion comprising a polymer of the same organic oxygen compound.

11. The product described in claim 10 in which the organic oxygen compound is an ester of an unsaturated acid and allyl alcohol.

12. The product described in claim 10 in which the organic oxygen compound is allyl crotonate.

13. A transparent integral sheet of resin having an exterior surface portion comprising a hard, scratch-resistant and substantially infusible and insoluble polymer of an organic oxygen compound containing at least two polymerizable groups which are unconjugated with respect to the carbon, and having an interior portion relatively softer than and polymerized to a lesser extent than said exterior portion, said interior portion comprising a polymer of the same organic oxygen compound.

14. A transparent integral sheet of resin having an exterior portion comprising a hard, scratch-resistant and substantially infusible and insoluble polymer of an organic oxygen compound containing at least two polymerizable groups which are unconjugated with respect to carbon, and having a softer interior portion in which the hardness gradually increases as the outer surface is approached, said interior portion comprising a polymer of the same organic oxygen compound.

15. In a method of preparing a resin composition by polymerization of organic oxygen compounds containing two polymerizable groups which are unconjugated with respect to carbon, the step of polymerizing the exterior surface to a hard infusible state while simultaneously polymerizing the interior to a relatively softer state.

16. A method of polymerizing a compound containing at least two polymerizable unsaturated groups which comprises polymerizing a body of said compound and controlling polymerization to permit a substantially greater degree of polymerization adjacent one surface of the body than adjacent an opposed surface thereof.

17. A method of polymerizing a compound containing at least two polymerizable unsaturated groups which comprises polymerizing a body of said compound and controlling polymerization to permit a substantially greater degree of polymerization adjacent one surface of the body than adjacent an opposed surface thereof, and subsequently further polymerizing said opposed surface.

18. A resin product comprising an exterior surface of a hard substantially infusible polymer of a compound containing two polymerizable unsaturated groups which are unconjugated with respect to carbon and an interior of a softer polymer of the same compound.

19. A transparent sheet of resin comprising polymers of a single monomeric compound having two polymerizable unsaturated groups, said sheet having a hard exterior surface and a relatively softer interior, the hardness of said sheet being graduated continuously from the exterior surface to said soft interior.

20. A transparent sheet of resin comprising polymers of a single monomeric compound having two polymerizable unsaturated groups, having a hard exterior surface and a relatively softer interior, the quantity of plasticizer in said polymer being graduated from a minimum at the exterior surface to a maximum in the softer interior.

21. A transparent sheet of resin comprising polymers of a single monomeric compound having two polymerizable unsaturated groups, having a hard exterior surface and a relatively softer interior, the extent of polymerization being graduated from a maximum at said exterior surface and a minimum at said softer interior.

IRVING E. MUSKAT.
MAXWELL A. POLLACK.
FRANKLIN STRAIN.
WILLIAM A. FRANTA.